United States Patent [19]

Kobayashi et al.

[11] Patent Number: 5,796,799
[45] Date of Patent: Aug. 18, 1998

[54] CONTROL APPARATUS FOR OXYGEN CONCENTRATION OF WATER IN ATOMIC REACTOR

[75] Inventors: Hiroko Kobayashi, Kobe; Takashi Sasaki, Miki; Kiyoshi Hirai, Kakogawa; Shinichi Yasui, Kako-gun; Mamoru Nagao, Osaka; Hiroyuki Harada, Tokyo, all of Japan

[73] Assignees: Shinko Pantec Co., Ltd., Kobe; Mitsubishi Corporation, Tokyo, both of Japan

[21] Appl. No.: 548,091

[22] Filed: Oct. 25, 1995

[30] Foreign Application Priority Data

Oct. 25, 1994 [JP] Japan .................. 6-260024

[51] Int. Cl.⁶ ........................... G21C 19/317
[52] U.S. Cl. ............... 376/306; 376/300; 204/263; 205/628
[58] Field of Search .............. 376/300, 306; 204/252, 263, 266; 205/628, 629, 637, 638

[56] References Cited

U.S. PATENT DOCUMENTS 5,467,375  11/1995  Sasaki ................ 376/300
5,484,512  1/1996  Sasaki et al. ........... 204/263

FOREIGN PATENT DOCUMENTS

52-11397   1/1977  Japan .
58-105097  6/1983  Japan .
2-116795   5/1990  Japan .

*Primary Examiner*—Daniel D. Wasil
*Attorney, Agent, or Firm*—Marshall, O'Toole, Gerstein, Murray & Borun

[57] ABSTRACT

An apparatus for controlling dissolved oxygen concentration in primary and secondary cooling water in boiling water and pressurized water atomic reactors is disclosed. The apparatus contains an electrolytic cell having an anode chamber and a cathode chamber separated from one another by a diaphragm of a solid polymer electrolyte membrane. The diaphragm contains: (a) an ion exchange membrane and (b) a pair of multilayered electrodes chemically plated to both surfaces of the ion exchange membrane. The electrolytic cell is operatively connected to a circular route for cooling water in the reactor, and hydrogen gas generated through electrolysis of deionized water in the cathode side of the cell is introduced into the circular route for the cooling water to control the dissolved oxygen concentration of the cooling water.

11 Claims, 6 Drawing Sheets

PRIOR ART

CONTROL APPARATUS FOR OXYGEN CONCENTRATION OF WATER IN ATOMIC REACTOR

FIELD OF THE INVENTION

The present invention relates to control apparatus for oxygen concentration in primary cooling water and secondary cooling water, respectively, in a nuclear reactor.

BACKGROUND OF THE INVENTION

Figure 1:
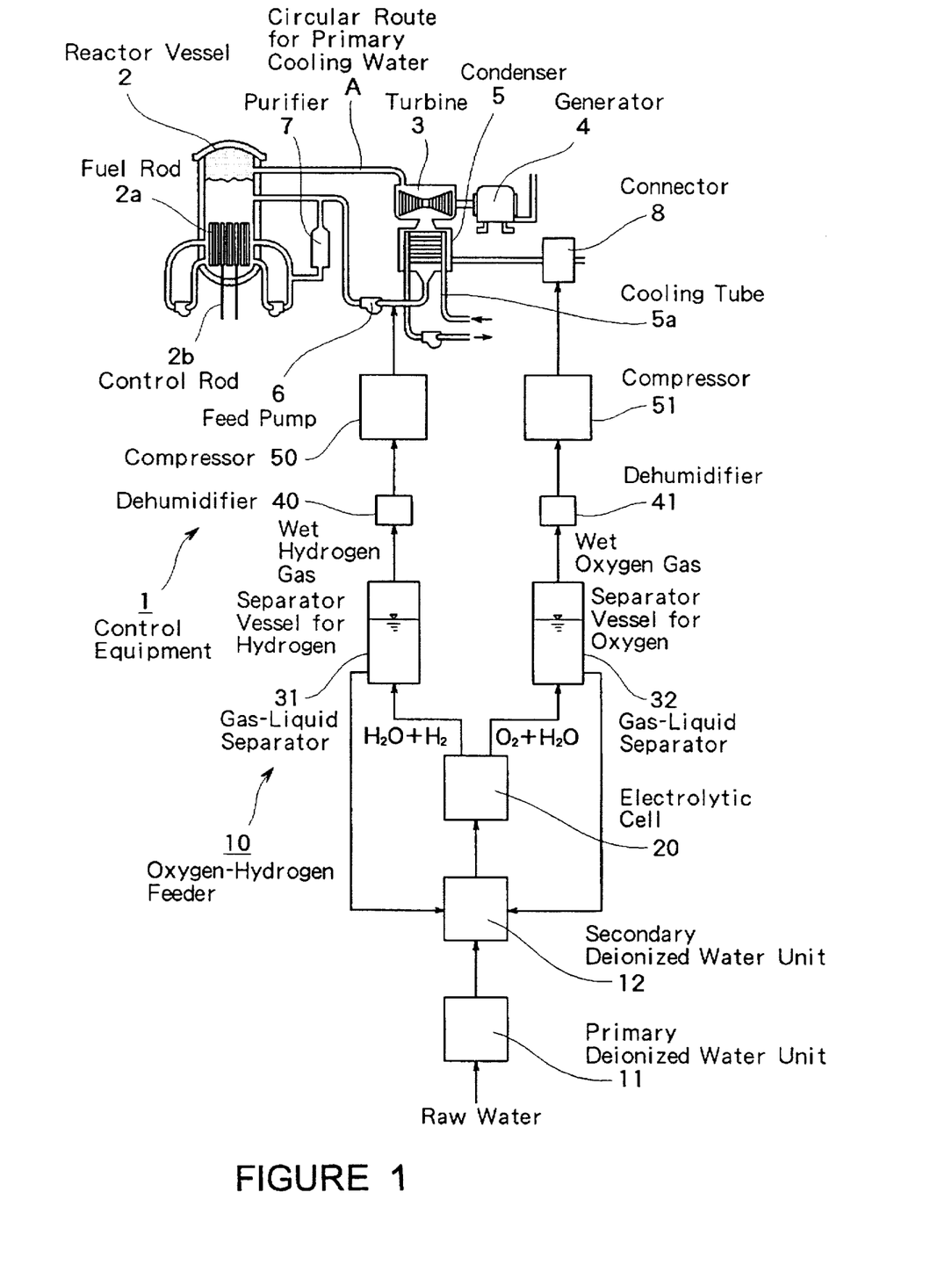
FIG. 1 is a schematic view showing a control apparatus of the invention.

In general, primary cooling water is circulated to and from a reactor vessel through a turbine and a condenser in the boiling reactor of a light-water reactor (see, for example, reactor vessel 2, turbine 3, and condenser 5 in FIG. 1). Otherwise, cooling water is circulated to and from a reactor vessel of a pressurized water reactor through a pressurizer and a steam generator (see, for example, reactor vessel 62, pressurizer 68, and steam generator 69 in FIG. 6). In each case, it is known that water is converted into hydrogen gas and oxygen gas by radiation emitted during operation of the atomic reactor. The oxygen so produced remains as dissolved oxygen in the primary cooling water.

Oxygen dissolved in the primary cooling water can lead to the development of cracks in reactor components, such as the turbine, condenser and cooling tubes, respectively, due to stress corrosion attributed to contact with the primary cooling water.

Conventionally, as shown in Japanese Provisional Patent Publication No. 52-11397, by treating an exhaust gas, hydrogen gas is separated, collected from a condenser, and stored in a storage vessel. As further disclosed, the hydrogen gas is used in a method which directly feeds hydrogen gas into the primary cooling water from the storage vessel.

According to this method, however, the storage vessel for the hydrogen gas is under high pressure, and the presence of the vessel in a nuclear power plant poses safety problems because unexpected accidents can occur at an earthquake, fire, or the like.

In view of the foregoing problems, Japanese Provisional Patent Publication No. 58-105097 discloses a method of controlling the concentration of dissolved oxygen in primary cooling water by circulating water that is enriched in dissolved hydrogen through the atomic reactor, wherein the water is treated by an electrolysis unit having thin, film-like electrodes prepared by separately providing an anode and a cathode on both surfaces of a diaphragm manufactured from a solid electrolyte.

However, to perform this method, complicated apparatus and controls are necessary to subject the water and hydrogen gas to high pressure and high temperature. With respect to this issue, Japanese Provisional Patent Publication No. 2-116795 discloses a method of controlling the concentration of dissolved oxygen in primary cooling water by feeding high pressure hydrogen gas, which was produced in an electrolysis unit having a solid electrolyte, into the primary cooling water. This prior art discloses an electrolysis unit incorporating electrodes prepared by providing noble metals on both surfaces of an ion exchange membrane.

In the prior art, because electrolysis units mainly used potassium hydroxide (i.e., KOH) as an electrolyte, the generated oxygen gas and hydrogen gas contained the electrolyte as an impurity. Accordingly, such an electrolysis unit has disadvantages because, when the gases pass through a reactor core, they can be activated. The radioactive level of the cooling water will be increased, and workers will be exposed to excessive radiation.

2

Therefore, to avoid problems associated with excessive radiation as noted above, an extra apparatus, like a scrubber for removing impurities such as potassium hydroxide from the hydrogen gas generated in the electrolysis unit, were necessary. Further, since waste water containing potassium hydroxide also is drained from the scrubber, there is another disadvantage because of the need to further treat the waste water and provide large scale apparatus therefor.

In Japanese Provisional Patent Publication No. 2-116795 noted previously, and as shown in FIG. 5 herein, because electrodes 101 and 102, respectively, are made of noble metals of several millimeter (mm) thickness, and are positioned in close proximity to opposing surfaces of ion exchange membrane 100, water enters into slight (narrow) spaces 103 and 104 between the ion exchange membrane 100 and electrodes 101 and 102. Total electrical resistance, therefore, is increased while current flow is decreased. Thereby, the amount of the hydrogen gas generated at the cathode is reduced, and the ability to reduce dissolved oxygen in the primary cooling water is inhibited. In addition, if the water is electrolyzed under high current density or at high temperature, current distribution on electrodes is not uniform because of the water. Consequently, the current is concentrated on particular portions of the membrane 100, and the membrane 100 is damaged due to the generation of heat.

Further, according to the invention of Japanese Provisional Patent Publication No. 2-116795, since the hydrogen gas generated from the electrolysis unit had been supplied to the cooling water by directly pressurizing the hydrogen gas generated from the electrolytic cell with a compressor, impurities such as oil used in the compressor can enter into hydrogen gas. Hydrogen gas contains water because hydrogen gas is generated through electrolysis of water. Such impurities and water can shorten durability of a sealed portion of the compressor. Then, water in the hydrogen gas may also corrode components of the compressor.

Figure 6:
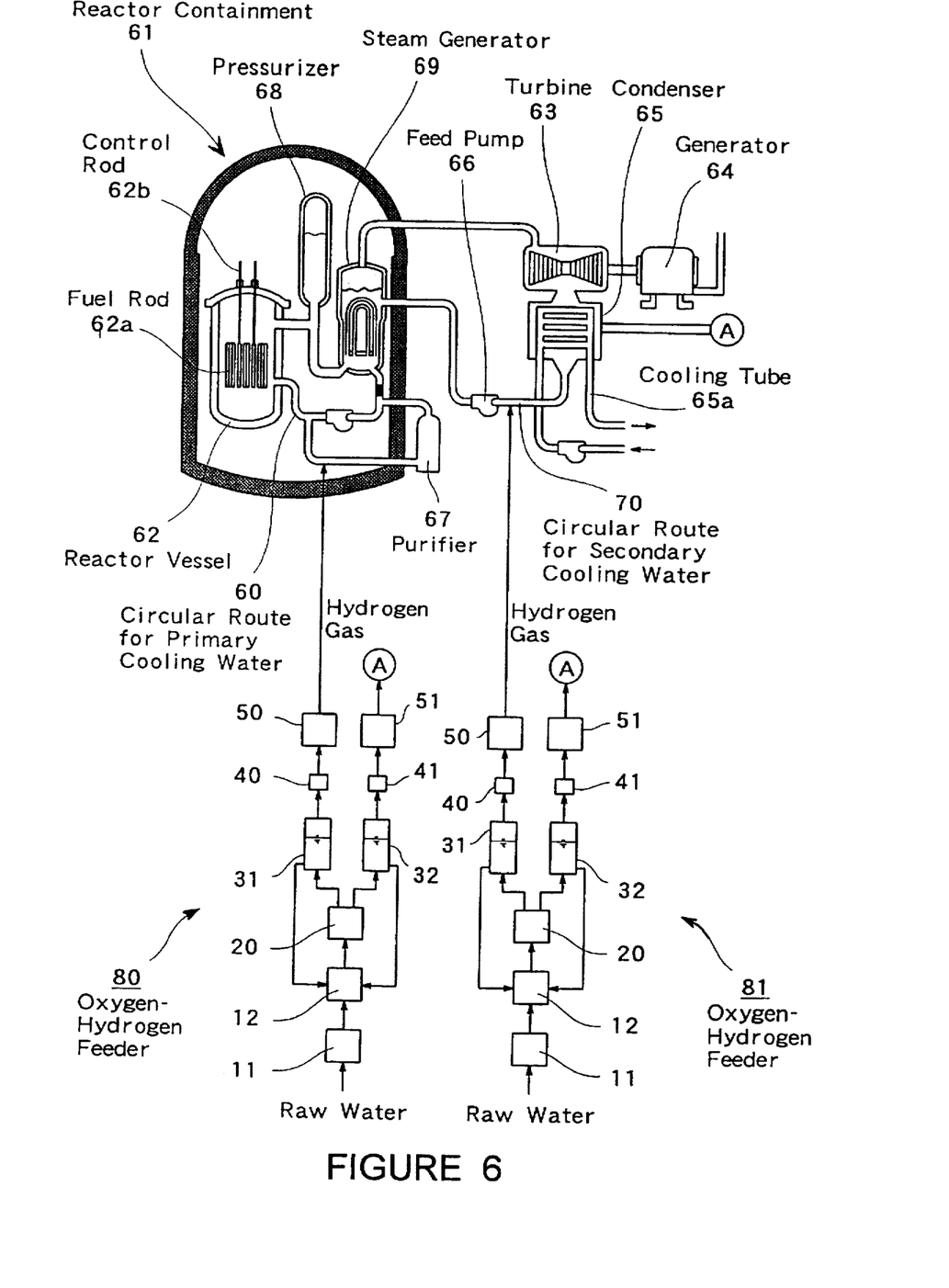
FIG. 6 is a schematic view showing another embodiment of the control apparatus of the invention.

Turning to a pressurized water reactor, as illustrated in FIG. 6, there is a circulating route 70 for secondary cooling water to return the water to a steam generator 69 in a circulating route 60 for the primary cooling water from the same through a turbine 63 and a condenser 65. However, corrosion in components of circulating route 70 were found. Further, to enhance the reducing atmosphere, deoxidation with hydrazine and pH adjustment with aqueous ammonia was performed. Because these operations require the addition of chemicals, problems of leaking resulted, and exact addition of the chemicals is difficult.

In view of the foregoing problems in the art, the present invention provides an apparatus which avoids cracks due to stress corrosion in components of the apparatus and in tubes for the cooling water, by effectively feeding the generated, high purity hydrogen gas into the primary cooling water. Thereby, the concentration of dissolved oxygen in the cooling water is reduced.

In addition, the present invention provides an apparatus which eliminates corrosion in components of the apparatus and tubes for the secondary cooling water, by feeding the high purity hydrogen gas, as a reducing agent, into the circular route for the secondary cooling water in the pressurized water reactor.

The present invention further provides a control apparatus for concentration of oxygen in the cooling water, wherein water in the hydrogen gas generated from an electrolysis unit is removed. Accordingly, durability of the sealed portion of the compressor is improved, components of the

3 compressor are not corroded, and contamination by impurities, like oil used in the compressor, are substantially reduced.

DETAILED DESCRIPTION OF THE INVENTION

The present invention overcomes the problems of the aforementioned prior art and achieves the purposes of the invention, the substantial merits of which are as follows.

The present invention is directed to control apparatus for the oxygen concentration of cooling water in a boiling water reactor. The present invention comprises an electrolytic cell having an anode chamber and a cathode chamber separated from one another by a diaphragm, said diaphragm comprises a solid polymer electrolyte membrane made from an ion exchange membrane, and a pair of electrodes prepared by chemical plating metals (electrodes) to both surfaces of the ion exchange membrane. The electrolyte cell is so positioned to be operatively connected to a circular route for primary cooling water in the reactor, wherein hydrogen gas generated at the cathode side of the cell is supplied to the circular route for the primary cooling water. The concentration of dissolved oxygen in the primary cooling water in the reactor, therefore, is controlled.

Further, the present invention also is directed to another control apparatus for oxygen concentration in the cooling water of a pressurized water reactor. The control apparatus comprises an electrolytic cell having an anode chamber and a cathode chamber separated from one another by a diaphragm, said diaphragm comprising a solid polymer electrolyte membrane made from an ion exchange membrane and a pair of electrodes prepared by the chemical plating of metals (electrodes) to both surfaces of the ion exchange membrane. The electrolytic cell is so positioned to be operatively connected to a circular route for primary cooling water and to a circular route for secondary cooling water in the reactor, and the circular route for secondary cooling water is arranged to be heat-exchanged with the circular route for primary cooling water in the reactor. Then, hydrogen gas generated at the cathode side of the cell is supplied to the both circular routes for primary and secondary cooling water. The concentration of dissolved oxygen in the primary and secondary cooling water in the reactor, therefore, is controlled.

In accordance with another embodiment of the invention, the electrodes are multilayered structures prepared by plating two or more platinum metals or platinoids to the membrane.

In accordance with another embodiment of the invention, a dehumidification membrane module to remove moisture from the generated hydrogen gas is positioned between the cathode side of the cell and the circular route for the primary and/or the secondary cooling water running in the reactor.

In accordance with another embodiment of the invention, said dehumidification module allows flow of dry air through a fluorocarbon resin-based hollow fiber membrane, in a reverse direction of the flow of hydrogen gas generated at the cathode side of the cell.

In accordance with the another embodiment of the invention, said module is connected to an oil-free compressor.

EXAMPLES

The present invention is described in the following examples by referring to the figures attached hereto.

FIG. 1 is a schematic view showing a control apparatus of the invention, wherein denotation 1 refers to a control apparatus of the invention (hereinafter referred to as "control apparatus"). In this example, although control apparatus 1 is referred as an apparatus for a boiling water reactor, the apparatus also can be used with other atomic reactors, for example, a pressurized water reactor as noted below.

In an atomic reactor 2, nuclear reactions are controlled by a fuel rod 2a as well as a control rod 2b provided respectively in reactor 2. High pressure and high temperature steam is generated by heating the primary cooling water in reactor 2 with heat generated through a nuclear reaction. The steam is supplied to a turbine 3 connected to reactor 2, and by driving a rotator of the turbine 3 with the steam, electric power is generated in a generator 4 connected to turbine 3.

In addition, the steam that drives turbine 3 is directed to a condenser 5 connected to turbine 3. Then, the steam becomes condensate by cooling and condensing the steam with the secondary cooling water, such as sea water, passing through cooling tubes 5a provided in condenser 5. The primary cooling water as condensate in condenser 5 is transferred to a feed pump 6. Then, metallic impurities are removed from the primary cooling water with a purifier 7, such as an ion exchanger, and the primary cooling water is returned into atomic reactor 2 (see the circular route for the primary cooling water in FIG. 1).

Hydrogen in an exhaust gas expelled from condenser 5 is directed to a connector 8 in which water is produced by contacting the hydrogen with oxygen in the presence of a catalyst, such as platinum.

Further, hydrogen gas of high purity and high pressure from an oxygen-hydrogen feeder 10 is supplied between condenser 5 and feed pump 6. Thereby, the concentration of dissolved oxygen in the primary cooling water is reduced, and cracks due to stress corrosion in apparatus components, such as the turbine, the condenser, and tubes for the primary cooling water, also are prevented.

The feeder 10 comprises a primary deionized water unit 11 including, for example, a micron filter for purifying raw water, and a secondary deionized water unit 12 including, for example, reverse osmosis (RO) equipment and an ion exchange resin column. Deionized water exiting unit 12 is supplied to an electrolytic cell 20 equipped with a diaphragm of a solid polymer electrolyte membrane 21 (hereinafter referred to as "diaphragm"). The diaphragm 21 comprises a solid polymer electrolyte 28 and a pair of electrodes 22 and 23 (see FIG. 2). Deionized water in anode side of the cell 20 is electrolyzed therein.

Hydrogen gas generated at the cathode side is transferred to a gas-liquid separator 31. Moisture in the hydrogen gas then is removed with a dehumidifier 40, which includes a dehumidification membrane module. The hydrogen gas then is introduced into the cooling water through a compressor 50 to provide primary cooling water having, for example, at 50 Nm³/hr (Normal cubic meters per hour), having a concentration of dissolved oxygen of 20 ppb (parts per billion) or less, a conductivity of 0.3 μS (microSiemens) or less, and a corrosion current density of −230 mV (millivolts) (with Standard Hydrogen Electrode) or less.

In accordance with the present invention, compressor 50 is an oil-free compressor. For example, motor-driven, air-driven, or oil-pressure-driven reciprocating compressors are available, in which diaphragm-type compressor and sliding elements are oil free. When the inner pressure of cylinder has been raised, gas leaking from piston rod-packing is purged with nitrogen gas. To raise concentration of dissolved hydrogen in the primary cooling water, as well as to further raise the water pressure of the primary cooling water for easy introduction of the hydrogen gas into a route for the primary cooling water, hydrogen gas is supplied to compressor 50. In consideration of the Japanese high pressure gas control regulation, hydrogen gas of 4 kg/cm² (kilogram per square centimeter) or less is pressurized to up to 10 kg/cm². But, to raise the pressure further also is contemplated in this invention.

Furthermore, in accordance with the present invention, oxygen gas generated from anode 22 side is transferred to a gas-liquid separator 32. Moisture in the oxygen gas then is removed with a dehumidifier 41, which includes a dehumidification membrane module. The oxygen gas is supplied to connector 8 through a compressor 51, for example at 25 Nm³/hr. Hydrogen gas in the exhaust gas expelled from condenser 5 is combusted with the oxygen gas generated by electrolysis. Water produced in the separators 31 and 32 is returned to secondary deionized water unit 12.

Figure 2:
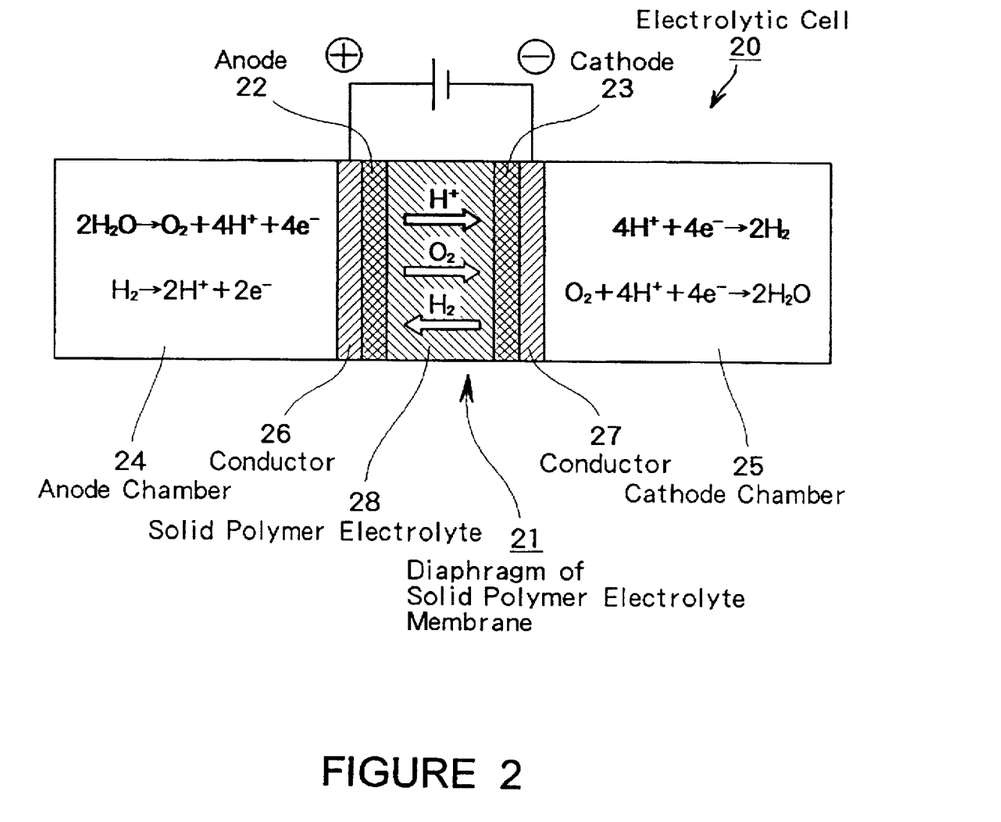
FIG. 2 is a schematic view showing an electrolytic cell of a control apparatus of the invention.

The electrolytic cell 20 (i.e., electrolysis apparatus) previously mentioned, and shown in FIG. 2, comprises a diaphragm 21 comprising a porous solid polymer electrolyte 28 and a pair of porous electrodes (i.e., an anode 22 and a cathode 23) prepared by chemical plating a platinum metal (electrode) to both surfaces of a solid polymer electrolyte 28, such as a cation exchange membrane, like a fluorocarbon resin sulphonic acid cation exchange membrane, e.g., NAPHION 111 (E. I. DuPont de Nemours, Wilmington, Del.). Electrolytic cell 20 has an anode chamber 24 and a cathode chamber 25 separated from each other for generating oxygen gas at anode 22 and hydrogen gas at cathode 23. Hydrogen gas at cathode 23 is prepared by continuously supplying deionized water to diaphragm 21 and electrolyzing the water. Preferably, electrodes 22 and 23 are made of platinum. Especially preferred are electrodes prepared as layers of platinum and iridium, which can serve a longer term of about four years at 80° C. at high current density of 200 A/dm² (ampere per square decimeter) in comparison to, for example, 50–70 A/dm² of the conventional electrodes of solid electrolyte wherein the electrodes are contacted with the ion exchange membrane. In addition to the iridium noted above, a diaphragm including multiple layers of solid polymer electrolyte prepared by plating two or more platinum metals to a membrane are also available. Such a diaphragm exhibits an improved high current density. It is further preferable to provide feeder plates 26 and 27 (feed source) as a conductor. Feeder plates 26 and 27 are arranged to contact electrodes 22 and 23 and comprise a metallic mesh such as titanium, a carbonous porous plate, or a conductive ceramic porous plate.

At anode 22 of cell 20, as shown in FIG. 2, oxygen gas is generated as a result of the reaction noted below as formula (I).

$$2 H_2O \rightarrow O_2 + 4H^+ + 4e^-  \qquad (I)$$

On the other hand, hydrogen gas is generated at the cathode side through the reaction noted below as formula (II).

$$4H^+ + 4e^- \rightarrow 2H_2 \qquad (II)$$

Then, when the hydrogen gas from the cathode side passes through the membrane, the reaction noted below as formula (III) is processed at the anode 22.

$$H_2 \rightarrow 2H^+ + 2e^- \qquad (III)$$

Further, when oxygen gas from the anode side has passed through the membrane, the reaction noted below as formula (IV) is processed at cathode 23.

$$O_2 + 4H^+ + 4e^- \rightarrow 2H_2O \qquad (IV)$$

In cell 20 having diaphragm 21, because reactions (III) and (IV) proceed at an interface between electrodes 22 and 23 in which both electrodes are made as metallic layers plated on the membrane, the oxygen concentration in the hydrogen gas, as well as hydrogen concentration in the oxygen gas, is reduced, and, accordingly, high purity oxygen gas and hydrogen gas can be produced. For instance, at 100 A/dm², 99.68% pure hydrogen gas and 99.95% pure oxygen gas are produced by a conventional solid electrolyte in which electrodes are contacted with anion exchange membrane. In contrast, hydrogen gas of 99.999% purity or greater, and oxygen gas of 99.999% purity or greater, are produced by a diaphragm of the present invention.

Figure 5:
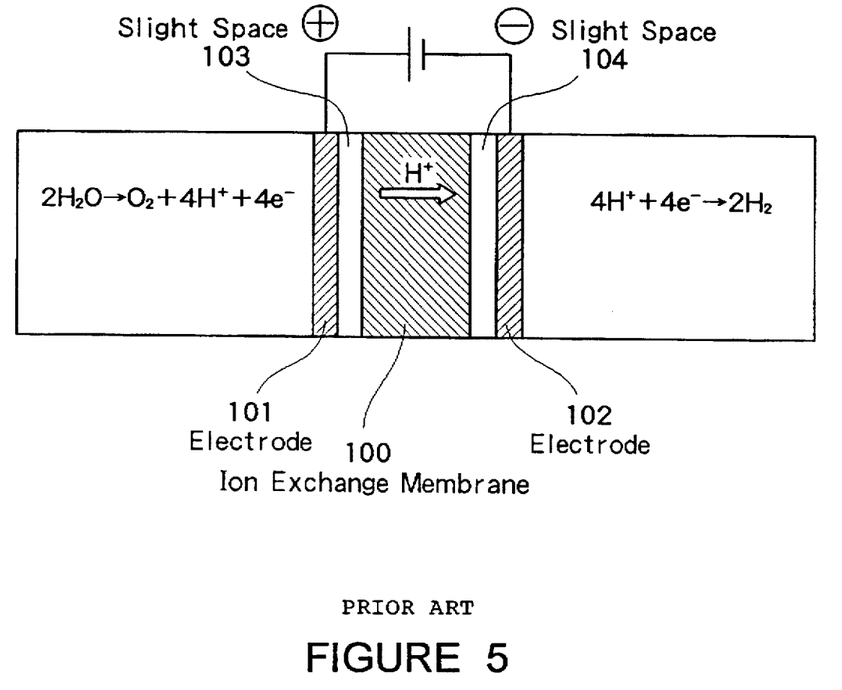
FIG. 5 is a schematic view of a prior art electrolysis unit having electrodes and a diaphragm manufactured of solid electrolyte.

Further, as shown in FIG. 5, a conventional solid electrolytic cell has narrow spaces 103 and 104 between ion exchange membrane 100 and electrodes 101 and 102. The narrow space allows penetration and formation of a layer of water. In contrast thereto, because electrodes 22 and 23 of the diaphragm 21 of the present invention (in FIG. 2) have been prepared by chemical plating noble metals to surfaces of solid polymer electrolyte 28, there are no such spaces in diaphragm 21. Further, solution resistance attributed to resistance by water present between electrolyte 28 and electrodes 22 and 23, and gas resistance attributed to gas generated from water present between electrolyte 28 and electrodes 22 and 23, has been eliminated. Accordingly, contact resistance between electrolyte 28 and electrodes 22 and 23 is reduced, applied voltage is reduced, and current distribution becomes uniform.

In addition, high current density, high temperature electrolysis, and high pressure electrolysis can be achieved. In addition, high purity oxygen gas, as well as hydrogen gas, can be effectively obtained.

As stated previously, hydrogen gas generated from the cathode side of cell 20 is transferred to gas-liquid separator 31, then moisture in the hydrogen gas is removed with dehumidifier 40 which includes a dehumidification membrane module. The dehumidified hydrogen gas is introduced into the cooling water through a compressor 50. A dehumidifier 40 of the present invention is as follows.

Figure 3:
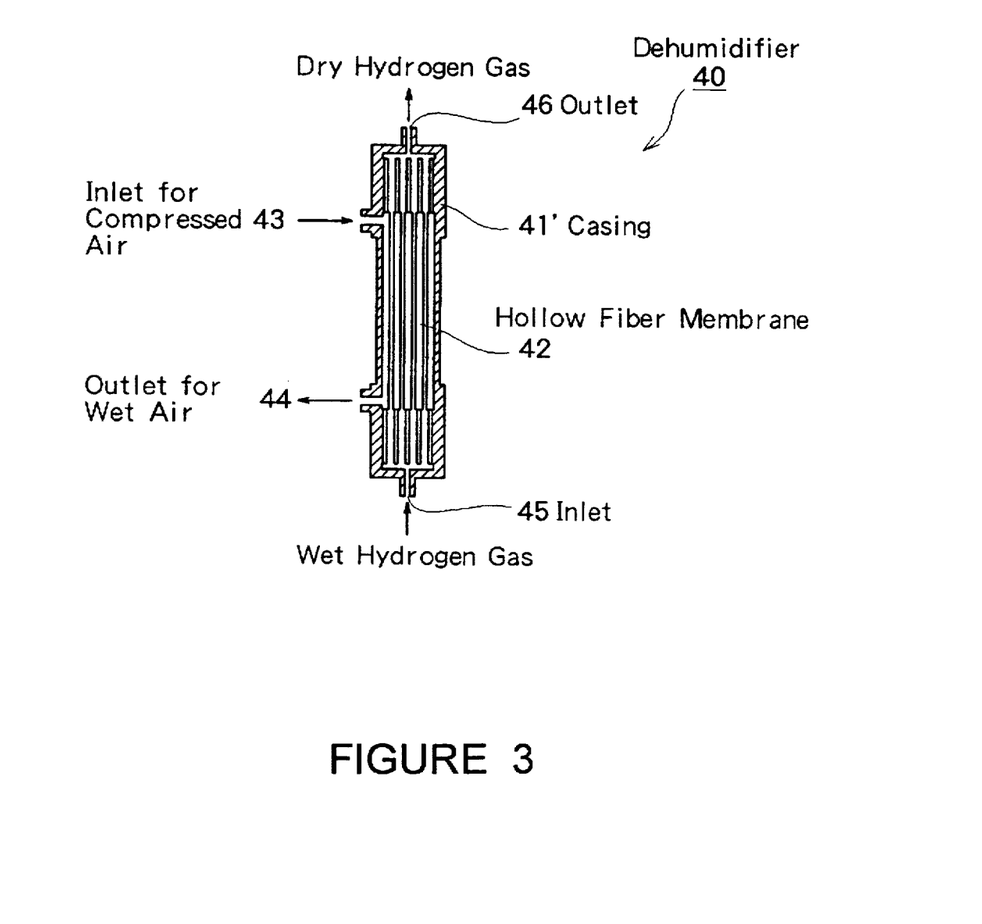
FIG. 3 is a schematic view showing a dehumidifier of a control apparatus of the invention.

As shown in FIG. 3, dehumidifier 40 employs a dehumidification membrane module to provide a fluorocarbon-resin hollow fiber membrane 42 within a cylindrical casing 41'. Hydrogen gas generated from cathode side of the cell 20 is introduced into an inlet 45 formed as an opening at the bottom of casing 41'. The hydrogen gas passes through membrane 42, and flows from an outlet 46 formed as an opening at the top of the casing 41'. Dry air is passed over the fluorocarbon resin-based hollow fiber membrane, in a reverse direction from the hydrogen flow, from an inlet 43 formed as an opening near the top of casing 41'. Then, dry air is exhausted from an outlet 44 formed as an opening near the bottom of the casing 41'. Membrane 42 does not pass any gas except for water vapor. Moisture in the hydrogen gas migrates to the dry air by ionic hydration due to an affinity for water and is removed from the hydrogen gas. An example of such a dehumidifier "SUNSEP-W™" is available from Asahi Grass Co. Ltd.

Accordingly, in comparison to a dehumidifier employing a molecular sieve, dehumidifier 40 has a simple structure. Consequently, it is not necessary to perform troublesome regeneration maintenance on the dehumidifier, and impurity particles, such as alumina, do not enter the hydrogen gas. Therefore, high purity, dehumidified hydrogen gas can be obtained. Further, with respect to compressor 50, the durability of the sealed portion of the compressor had been improved, and components of the compressor are not corroded.

Figure 4:
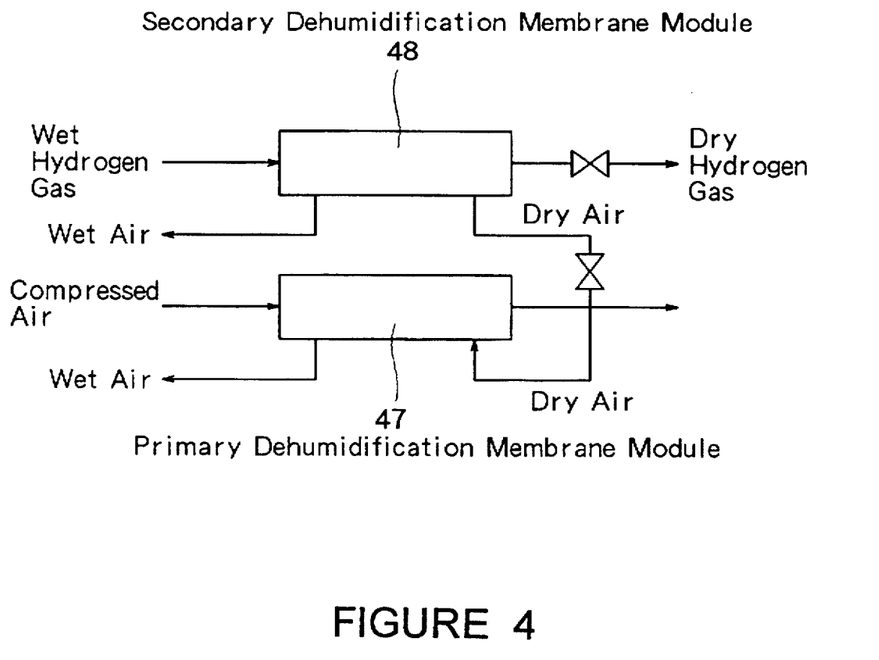
FIG. 4 is a schematic view showing another embodiment of a dehumidifier of a control apparatus of the invention.

FIG. 4 shows another embodiment of dehumidifier 40 in which two aforementioned modules are connected in series. In other words, compressed air is dried with a primary module 47, and hydrogen gas is dehumidified in a secondary module 48 employing said dry air as dehumidification gas. Since highly dried air can be used as a dehumidification gas for the hydrogen gas, dehumidification of the hydrogen gas is enhanced.

The structure of dehumidifier 41 connected to anode side of cell 20 can be similar to that of dehumidifier 40 described previously.

FIG. 6 shows the another embodiment of the control apparatus for oxygen concentration in the cooling water. This apparatus can be used in conjunction with a pressurized water reactor.

With reference to FIG. 6, a pressurized water reactor comprises a circular route 60 for the primary cooling water, in which the primary cooling water is circulated to and from a reactor vessel 62 in a reactor containment 61 through a pressurizer 68, a steam generator 69 and a purifier 67. Like the foregoing example, the cathode side of an oxygen-hydrogen feeder 80, which comprises an electrolytic cell, a gas-liquid separator, a dehumidifier and a compressor, is connected between vessel 62 and purifier 67. Dissolved oxygen concentration in the primary cooling water running in circular route 60 is reduced by feeding hydrogen gas into the primary cooling water. Therefore, cracks in components of the apparatus, as well as in the tubes of pressurizer 68 and steam generator 69 in circular route 60, can be eliminated.

With respect to the amount of hydrogen gas to be added to the primary cooling water, in view of cracks attributed to stress corrosion, as aforementioned, as well as to avoid hydrogen shortness of zirconium alloy (i.e., a component of covered fuel tubes) by the hydrogen absorption, it is preferable, for example, to adjust the dissolved hydrogen concentration in the primary cooling water to 15–50 cc (cubic centimeters) at normal temperature and pressure (NTP) per kg (kilogram) of water.

In addition, a pressurized water reactor comprises a circular route 70 for the secondary cooling water, in which the primary cooling water is heat-exchanged by circulating it to and from a steam generator 69 in circular route 60 through a turbine 63, a condenser 65 and a feed pump 66. Like the foregoing example, the cathode side of an oxygen-hydrogen feeder 81 is connected between condenser 65 and feed pump 66. Then, the dissolved oxygen concentration in the secondary cooling water running in circular route 70 is reduced by feeding hydrogen gas thereto to achieve the same effects obtained by adding reducing agents. Further, corrosion in components of the apparatus, such as steam generator 69, turbine 63 and condenser 65, also are avoided.

With respect to the amount of the hydrogen gas to be added to the secondary cooling water, it is preferable to adjust dissolved oxygen concentration in the secondary cooling water to 0.005 ppm or less.

EFFECTS OF THE INVENTION

In accordance with the control apparatus for oxygen concentration of the present invention, the following unexpected effects are achieved.

1. Dissolved oxygen concentration in the primary cooling water running in a circulating route for the primary cooling water is reduced by feeding into a circulating route, which extends to and from a reactor core of an atomic reactor, hydrogen gas generated at a cathode through electrolysis of deionized water. The electrolysis utilizes an electrolytic unit containing a diaphragm comprising a solid polymer electrolyte membrane and a pair of electrodes. Stress corrosion cracks in components contacted with the primary cooling water are prevented because of a reduction of dissolved oxygen.

2. In particular, the electrolytic cell comprises an anode chamber and a cathode chamber separated from one another by a diaphragm having electrodes prepared by chemical plating metals (electrodes) to both surfaces of an ion exchange membrane. Accordingly, neither solution resistance attributed to water between the electrolyte and electrodes, nor gas resistance attributed to gas generated from such water, is possible. In addition thereto, contact resistance between the electrolyte and electrodes is reduced, applied voltage is lowered, and as a result, current distribution is uniform and high purity oxygen gas and hydrogen gas are effectively obtained. Further, by feeding the gas so produced into the primary cooling water, oxygen concentration in the primary cooling water is reduced, and cracks due to stress corrosion in apparatus components also are prevented.

3. A diaphragm can employ multilayered electrodes prepared by plating two or more platinum metals, like platinum and iridium, as plated metals. Such electrodes can perform electrolysis for a longer term under high current density, high temperature and high pressure conditions. Using this diaphragm, hydrogen gas can be produced effectively, then dissolved oxygen concentration in the primary cooling water is further reduced, and cracks due to stress corrosion in apparatus components also are prevented.

4. A route extending from the cathode chamber of the electrolytic cell to the circular route for the primary cooling water contains a dehumidification membrane module. Moisture in the hydrogen gas so generated is removed thereby, and the dehumidified hydrogen gas is supplied to the circular route. Then, in comparison with a dehumidifier having a molecular sieve, the module of the present invention has simple structure, wherein it is unnecessary to perform troublesome regeneration maintenance of the dehumidifier, and impurity particles, such as alumina, are not introduced into the hydrogen gas. Accordingly, high purity, dehumidified hydrogen gas can be supplied to the cooling water, then, dissolved oxygen concentration in the primary cooling water is further reduced, and cracks due to stress corrosion in apparatus components are prevented. Further, the durability of sealed portion of the compressor is improved, and components of the compressor are not corroded.

5. In a pressurized water reactor, because the cathode side of an oxygen-hydrogen feeder is positioned to heat exchange the secondary cooling water with the primary cooling water circulating to and from a steam generator through a turbine and a condenser, hydrogen gas can be supplied thereto. The hydrogen gas can reduce dissolved oxygen concentration because of the same effects derived by adding reducing agents to the secondary cooling water running in a circular route. Then, the corrosion of apparatus components, such as a steam generator, a turbine or a condenser, also is be avoided.

We claim:

1. An apparatus to control dissolved oxygen concentration of cooling water in a boiling water reactor, said apparatus comprising an electrolytic cell having an anode chamber and a cathode chamber separated from one another by a diaphragm of a solid polymer electrolyte membrane, said diaphragm comprising: (a) an ion exchange membrane, and (b) a pair of multilayered electrodes prepared by chemical plating two or more platinum metals or platinoids to both surfaces of said ion exchange membrane, wherein said electrolytic cell is operatively connected to a circular route for primary cooling water in the reactor, and wherein hydrogen gas generated through electrolysis of deionized water in the cathode side of the cell is introduced into said circular route for the primary cooling water to control the dissolved oxygen concentration of said primary cooling water.

2. The apparatus of claim 1 wherein said multilayered electrodes consist of a bilayer of platinum and iridium.

3. The apparatus of claim 1 or 2 wherein a dehumidification membrane module is operatively connected between the cathode side of the cell and the circular route for the primary cooling water to remove moisture from generated hydrogen gas.

4. The apparatus of claim 3 wherein said module comprises a fluoro hollow fiber membrane, and wherein dry air flows in a reverse direction of the hydrogen gas generated in the cathode side of the cell.

5. The apparatus of claim 3 wherein said module is operatively connected to an oil-free compressor.

6. An apparatus to control dissolved oxygen concentration of cooling water in a pressurized water reactor, said apparatus comprising an electrolytic cell having an anode chamber and a cathode chamber separated from one another by a diaphragm of a solid polymer electrolyte membrane, said diaphragm comprising: (a) an ion exchange membrane, and (b) a pair of multilayered electrodes chemical plated to both surfaces of said ion exchange membrane, wherein a first electrolytic cell is operatively connected to a circular route for primary cooling water and a second electrolytic cell is operatively connected to a circular route for secondary cooling water in the reactor, wherein said circular route for secondary cooling water is positioned to be heat exchanged with said circular route for primary cooling water, and wherein hydrogen gas generated through electrolysis of deionized water in the cathode side of the cells is introduced into said circular route for primary cooling water and into said circular route for secondary cooling water to control dissolved oxygen concentration of said primary and secondary cooling water.

7. The apparatus of claim 6 wherein said multilayered electrodes are prepared by plating two or more platinum metals or platinoids to both surfaces of said ion exchange membrane.

8. The apparatus of claim 6 or 7 wherein a dehumidification membrane module is operatively connected between the cathode side of the cell and the circular route for the primary cooling water to remove moisture from generated hydrogen gas.

9. The apparatus of claim 8 wherein said module comprises a fluoro hollow fiber membrane, and wherein dry air flows in a reverse direction of the hydrogen gas generated in the cathode side of the cell.

10. The apparatus of claim 8 wherein said module is operatively connected to an oil-free compressor.

11. The apparatus of claim 7 wherein said multilayered electrodes consist of a bilayer of platinum and iridium.

* * * * *

UNITED STATES PATENT AND TRADEMARK OFFICE
CERTIFICATE OF CORRECTION

PATENT NO. : 5,796,799
DATED : August 18, 1998
INVENTOR(S) : Hiroko Kobayashi et al.

It is certified that error appears in the above-identified patent and that said Letters Patent is hereby corrected as shown below:

Column 6, line 1, "2 $H_2 \cdot O_2 + 4H^+ + 4e^{31}$" should be -- 2 $H_2O \to O_2 + 4H^+ + 4e^-$ --

Column 6, line 5, "$4H^+ + 4e^- 2H_2$" should be -- $4H^+ + 4e^- \to 2H_2$ --

Column 6, line 11, "$H_2 \cdot 2H^+ + 2e^{31}$" should be -- $H_2 \to 2H^+ + 2e^-$ --

Signed and Sealed this

Thirtieth Day of November, 1999

Attest:

Q. TODD DICKINSON

*Attesting Officer*   *Acting Commissioner of Patents and Trademarks*